Patented May 29, 1934

1,960,564

UNITED STATES PATENT OFFICE 1,960,564

COMPOUND OF THE ANTHRAQUINONE SERIES

Karl Zahn and Werner Schultheis, Frankfort-on-the-Main-Hochst, Germany, assignors to General Aniline Works, Inc., New York, N. Y., a corporation of Delaware No Drawing. Application September 14, 1932, Serial No. 633,212. In Germany September 26, 1931

12 Claims. (Cl. 260—59)

The present invention relates to compounds of the anthraquinone series, particularly to acid wool dyestuffs, and to a process of preparing them.

We have found that valuable compounds of the anthraquinone series are obtainable by reacting a compound of the anthraquinone series containing in 1- and 4-positions substituents which are exchangeable for imino radicals as, for instance, halogen, hydroxy-, alkoxy- or nitro-groups, with a compound of the diphenyl series containing an amino group in 4-position and hydrogen in 4'-position. After sulfonation, acid dyestuffs are obtained which dye wool green tints. There is obtained, for instance, from 1.4-dichlor-anthraquinone by exchanging both chlorine atoms for 4-iminodiphenyl radicals and subsequently sulfonating the condensation product, a dyestuff which dyes wool from an acid bath yellowish-green tints of good fastness properties. The said dyeings, as compared with those obtainable from known dyestuffs of the same tints possess an enhanced fastness to washing and to fulling as well as a better evenness, especially in combinations.

New products are obtainable according to the present invention, for instance, those of the following general formula:

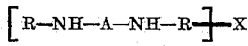

wherein A represents an anthraquinone radical which may be substituted by hydroxyl or a linked benzene nucleus, the anthraquinone radical being bound to the NH-groups in 1- and 4-positions, the R's represent identical diphenyl radicals which may be substituted by alkyl, halogen or carboxyalkyl, the diphenyl radicals being bound to the NH-groups in 4-positions and containing hydrogen in 4'-positions and wherein X means that the compound may be sulfonated.

The following examples serve to illustrate the invention, but they are not intended to limit it thereto, the parts being by weight:

1. 10 parts of leuco-quinizarin, 20 parts of quinizarin and 20 parts of boric acid are heated, while stirring, with 300 parts of 4-amino-diphenyl at 140° C. to 150° C. in a current of nitrogen gas until the color of the melt has become clear green. Thereupon, air is introduced at the same temperature and the excess of 4-amino-diphenyl is distilled off in vacuo; the dyestuff is freed from impurities by means of boiling alcohol and recrystallized from benzene. It forms crystals having a bronze-like luster and melting at 252° C. to 254° C. It dissolves in concentrated sulfuric acid to a blue solution and has the following constitution:

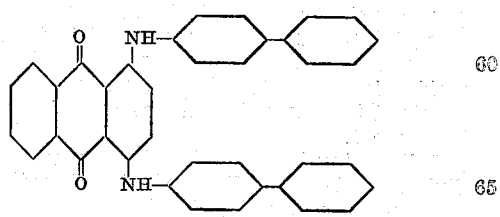

The dyestuff is sulfonated at 0° C. in fuming sulfuric acid of about 5 per cent strength. The sulfonic acid dyes wool from an acid bath green tints of good fastness properties.

2. 5 parts of 1.4-dichloro-anthraquinone are heated to boiling, while stirring, in 50 parts of 4-amino-diphenyl with addition of 5 parts of anhydrous sodium acetate, until the color of the melt which is at first red-brown has passed over blue to a clear green. The melt is then worked up as indicated in Example 1. There is obtained the same dyestuff as that described in Example 1.

3. By using in Example 1 instead of 4-amino-diphenyl 3-methyl-4-aminodiphenyl and by proceeding as described therein, a dyestuff is obtained which crystallizes from chlorobenzene in the form of blue needles melting at 263° C. to 264° C. It dissolves in concentrated sulfuric acid to a blue solution.

After sulfonation, the dyestuff dyes wool from an acid bath green tints of good fastness properties. A similar dyestuff is obtained by using 4-amino-4'-chlorodiphenyl.

4. By using in Example 2 instead of 1.4-dichloroanthraquinone 1.4-dichloro-5.8-dihydroxy-anthraquinone, a dyestuff is obtained which crystallizes from chlorobenzene in the form of red-brown needles and dissolves in concentrated sulfuric acid to a blue solution. It has the following probable constitution:

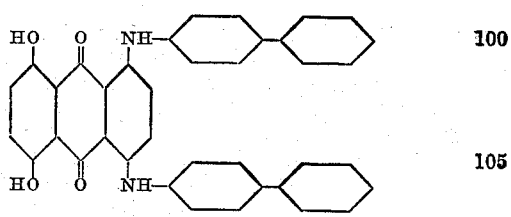

The dyestuff may be transformed, by the process described in Example 1, into the sulfonic acid which dyes wool from an acid bath yellowish-green tints of good fastness properties.

5. 3 parts of 1.2-benzo-5.8-dichloroanthraquinone are heated in 30 parts of 4-amino-diphenyl with addition of 3 parts of anhydrous sodium acetate. At about 270° C. to about 280° C. acetic acid escapes and the color of the melt turns violet. The temperature is then gradually raised to 320° C., whereby further evolution of acetic acid takes place and the color of the melt turns green. The melt is worked up as indicated in Example 1. The dyestuff crystallizes from chlorobenzene in the form of bluish-black crystals. It dissolves in strong sulfuric acid to a blue solution.

The dyestuff is sulfonated at about 0° C. in fuming sulfuric acid of about 5 per cent strength. The sulfonic acid dyes wool from an acid bath yellowish-green tints of good fastness properties.

6. 16 parts of quinizarin, 8 parts of leucoquinizarin, 24 parts of boric acid and 40 parts of 4-amino-diphenyl are heated with 400 parts of water at 160° C. for 10 hours in an autoclave. The bluish-green reaction product is freed from impurities by means of boiling alcohol and the residue is recrystallized from benzene. There is obtained the same dyestuff as that described in Example 1.

7. By using in Example 2 instead of 4-amino-diphenyl 4-amino-diphenyl-4'-carboxylic acid ethylester melting at 86° C. to 87° C. (obtainable by nitration of diphenyl-4-carboxylic acid ethylester, separation of 4-nitro-diphenyl-4'-carboxylic acid ethyl ester melting at 113° C. to 115° C. and subsequent reduction) and heating the melt at 260° C. for some time, a dyestuff is obtained which crystallizes from chlorobenzene in the form of bluish-black needles. It dissolves in sulfuric acid to a blue solution.

The dyestuff is sulfonated at 20° C. to 30° C. in fuming sulfuric acid of about 10 per cent strength. The sulfonic acid dyes wool green tints of good fastness properties.

We claim:

1. The compounds of the following general formula:

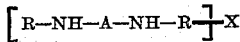

wherein A represents an anthraquinone radical which may be substituted by hydroxyl or a linked benzene nucleus, the anthraquinone radical being bound to the NH-groups in 1- and 4-positions, the R's represent identical diphenyl radicals which may be substituted by alkyl, halogen or carboxyalkyl, the diphenyl radicals being bound to the NH-groups in 4-positions and containing hydrogen in 4'-positions, and wherein X means that the compound may be sulfonated.

2. The compounds of the following general formula:

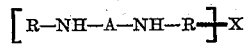

wherein A represents an anthraquinone radical which may be substituted by hydroxyl or a linked benzene nucleus, the anthraquinone radical being bound to the NH-groups in 1- and 4-positions, the R's represent identical diphenyl radicals which may be substituted by alkyl, halogen or carboxyalkyl, the diphenyl radicals being bound to the NH-groups in 4-positions and containing hydrogen in 4'-positions, and wherein X means that the compound is sulfonated, said products being acid dyestuffs dyeing wool green tints.

3. The compounds of the following general formula:

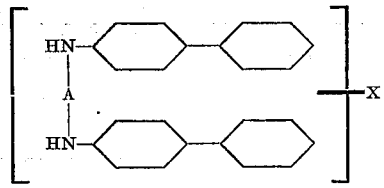

wherein A represents an anthraquinone radical which may be substituted by hydroxyl or a linked benzene nucleus, the anthraquinone radical being bound to the NH-groups in 1- and 4-positions, the R's represent identical diphenyl radicals which may be substituted by alkyl, halogen or carboxyalkyl, the diphenyl radicals being bound to the NH-groups in 4-positions and containing hydrogen in 4'-positions, and wherein X means that the compound is sulfonated, said products being acid dyestuffs dyeing wool green tints.

4. The product of the following formula:

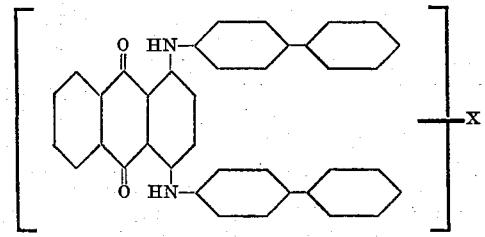

wherein X means that the compound is sulfonated, said product dyeing wool from an acid bath green tints of good fastness properties.

5. The product of the following formula:

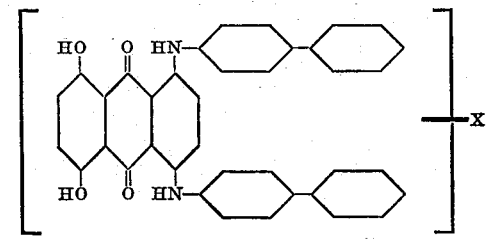

wherein X means that the compound is sulfonated, said product dyeing wool from an acid bath yellowish-green tints of good fastness properties.

6. The product of the following formula:

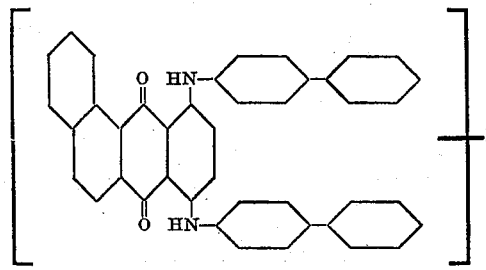

wherein X means that the compound is sulfonated, said product dyeing wool from an acid bath yellowish-green tints of good fastness properties.

7. The process which comprises reacting an anthraquinone which contains in 1- and 4-positions substituents which are exchangeable for imino radicals and which may further be substituted by hydroxy groups or a linked benzene nucleus, with a diphenyl compound which contains an amino group in 4-position and hydrogen in 4'-position and which may further be substituted by alkyl, halogen or carboxyalkyl.

8. The process which comprises reacting an anthraquinone which contains in 1- and 4-positions substituents which are exchangeable for imino radicals and which may further be substituted by hydroxy groups or a linked benzene nucleus, with a diphenyl compound which contains an amino group in 4-position and hydrogen in 4'-position and which may further be substituted by alkyl, halogen or carboxyalkyl, and sulfonating the product thus obtained.

9. The process which comprises reacting 1.4-dihydroxy-anthraquinone with a diphenyl compound which contains an amino group in 4-position and hydrogen in 4'-position and which may further be substituted by alkyl, halogen or carboxyalkyl.

10. The process which comprises reacting 1.4-dihydroxy-anthraquinone with a diphenyl compound which contains an amino group in 4-position and hydrogen in 4'-position and which may further be substituted by alkyl, halogen or carboxyalkyl and sulfonating the product thus obtained.

11. The process which comprises reacting 1.4-dihydroxy-anthraquinone with 4-aminodiphenyl.

12. The process which comprises reacting 1.4-dihydroxy-anthraquinone with 4-aminodiphenyl and sulfonating the product thus obtained.

KARL ZAHN.
WERNER SCHULTHEIS.